United States Patent
Ando et al.

(10) Patent No.: US 8,570,404 B2
(45) Date of Patent: Oct. 29, 2013

(54) COMMUNICATION DEVICE

(75) Inventors: Tatsunobu Ando, Kanagawa (JP);
Kazuya Katsuki, Tokyo (JP); Takashi Kagawa, Saitama (JP); Hirofumi Yuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/932,895

(22) Filed: Mar. 9, 2011

(65) Prior Publication Data
US 2011/0234831 A1 Sep. 29, 2011

(30) Foreign Application Priority Data
Mar. 25, 2010 (JP) ................ P2010-070384

(51) Int. Cl.
H04N 5/262 (2006.01)
H04N 5/228 (2006.01)
H04N 5/232 (2006.01)

(52) U.S. Cl.
USPC ............. 348/240.99; 348/222.1; 348/211.1

(58) Field of Classification Search
USPC ......... 455/556.1; 348/222.1, 14.08, 725, 731; 382/284, 294, 190; 725/38
See application file for complete search history.

(56) References Cited

U.S. PATENT DOCUMENTS

| | | | |
|---|---|---|---|
| 5,801,786 A * | 9/1998 | Song | 348/564 |
| 2004/0204060 A1* | 10/2004 | Makinouchi et al. | 455/556.1 |
| 2005/0046730 A1* | 3/2005 | Li | 348/333.12 |
| 2005/0180656 A1* | 8/2005 | Liu et al. | 382/284 |
| 2007/0040903 A1 | 2/2007 | Kawaguchi | |
| 2007/0076954 A1* | 4/2007 | Terakawa | 382/190 |
| 2009/0288121 A1* | 11/2009 | Shelby et al. | 725/62 |
| 2010/0079623 A1* | 4/2010 | Tomita | 348/240.99 |

FOREIGN PATENT DOCUMENTS

JP 2007-053513 A 3/2007

OTHER PUBLICATIONS http://www.skype.com/intl/ja/allfeatures/tv/.

* cited by examiner

*Primary Examiner* — Roberto Velez
*Assistant Examiner* — Stephen Coleman
(74) *Attorney, Agent, or Firm* — Lerner, David, Littenberg, Krumholz & Mentlik, LLP

(57) ABSTRACT

There is provided a communication device capable of improving a decline in the usability caused by an angle of view of a camera. The communication device includes: a camera capturing a picture; an information processing section detecting a face image from the picture captured by the camera, to generate a partial picture including the detected face image; a transmitting section encoding the partial picture to generate encoded data, and transmitting the encoded data to a counterpart; and a first receiving section receiving data transmitted from the counterpart, and decoding the received data to generate a picturephone picture.

13 Claims, 5 Drawing Sheets

1280 × 720 (HD SIZE)

1280 × 720 (HD SIZE)

640 × 480 (VGA SIZE)

COMMUNICATION DEVICE

CROSS-REFERENCE TO RELATED APPLICATION

The present application claims priority from Japanese Patent Application No. JP 2010-070384 filed in the Japanese Patent Office on Mar. 25, 2010, the entire content of which is incorporated herein by reference.

BACKGROUND OF THE INVENTION

1. Field of the Invention

The present invention relates to a communication device applicable to a picturephone using the Internet.

2. Description of the Related Art

In recent years, various electronic devices including a personal computer have become capable of accessing the Internet. With this trend, picturephones using the Internet have become widespread, and lately, even TV sets have become equipped with a picturephone function (see http://www.skype.com/intl/ja/allfeatures/tv/).

SUMMARY OF THE INVENTION

Picturephones are capable of interactively communicating not only sound but image. To acquire a picture, a small camera including a CCD (Charge Coupled Device) image sensor, a CMOS (Complementary Metal Oxide Semiconductor) image sensor or the like is generally used, and to display a picture, a display panel such as a liquid crystal panel or an organic EL (Electro Luminescence) panel is generally used. As this camera for the picturephone, one having a small angle of view is usually used. When an angle of view is wide, there is a possibility that a person will appear in a small size on a display panel, so that someone on the other side of the picturephone cannot see the face of the person. In addition, there is also a possibility that the entire room will appear so that untidiness of the room may be transmitted to the person on the other side of the picturephone. Therefore, as the camera for the picturephone, for example, one having around 45 degrees is used.

With the widespread use of the picturephones, the way of using the picturephone has also diversified. In particular, recently, the number of cases in which two or more people use one picturephone simultaneously to communicate with a counterpart has increased. In this case, to arrange all the members in an area that can be photographed by a camera, all the members need to be at positions away from the camera to some extent. In addition, even in a case where there is only one person speaking on the picturephone, the person needs to be at a position away from the camera to some extent when the person wants to move in front of the camera. As a result, the person appears in a small size on a display panel. Thus, the existing picturephones have such a problem that the usability is not so high because of the limitation to the angle of view of the camera.

In view of the foregoing, it is desirable to provide a communication device capable of improving a decline in the usability caused by an angle of view of a camera.

A communication device according to an embodiment of the present invention includes: a camera capturing a picture; and an information processing section detecting a face image from the picture captured by the camera, to generate a partial picture including the detected face image. This communication device further includes: a transmitting section encoding the partial picture to generate encoded data, and transmitting the encoded data to a counterpart; a first receiving section receiving data transmitted from the counterpart, and decoding the received data to generate a picturephone picture; and a display section capable of displaying the picturephone image.

In the communication device according to the embodiment of the present invention, the face image is detected from the picture captured by the camera, and the partial picture including the detected face image is generated. As a result, in the communication device of the counterpart, the partial picture is displayed as the picturephone picture in the display section. In other words, according to the embodiment of the present invention, rather than adjustment of the angle of view itself of the camera, adjustment of the picture size correlated with the angle of view of the camera is performed by the generation of the partial picture (clipping of the partial picture out of the original image).

In the communication device according to the embodiment of the present invention, the camera preferably has an angle of view of 60 degrees or more. Moreover, the communication device according to the embodiment of the present invention may be a television further including a second receiving section that receives a television broadcast signal, and generates a broadcast image by decoding the television broadcast signal. In this case, preferably, the information processing section causes, according to a user instruction, the display section to display either one or both of the picturephone picture and the broadcast picture.

In addition, in the communication device according to the embodiment of the present invention, preferably, the camera also functions as a human sensor. For example, when being unable to detect a face image from the picture captured by the camera, the information processing section may stop picture display in the display section, and subsequently, upon detection of a face image from the picture captured by the camera, the information processing section may cancel the stoppage of the picture display in the display section.

According to the communication device in the embodiment of the present invention, the picture size correlated with the angle of view of the camera is adjusted by the generation of the partial picture (the clipping of the partial picture out of the original picture). Thus, for example, when two or more people communicate with a counterpart by using one picturephone at the same time, or when a user moves in front of the camera, each person can be displayed in a large size on the display panel of the communication device of the counterpart. Therefore, it is possible to improve a decline in the usability due to the angle of view of the camera.

DETAILED DESCRIPTION OF THE PREFERRED EMBODIMENTS

Figure 5:
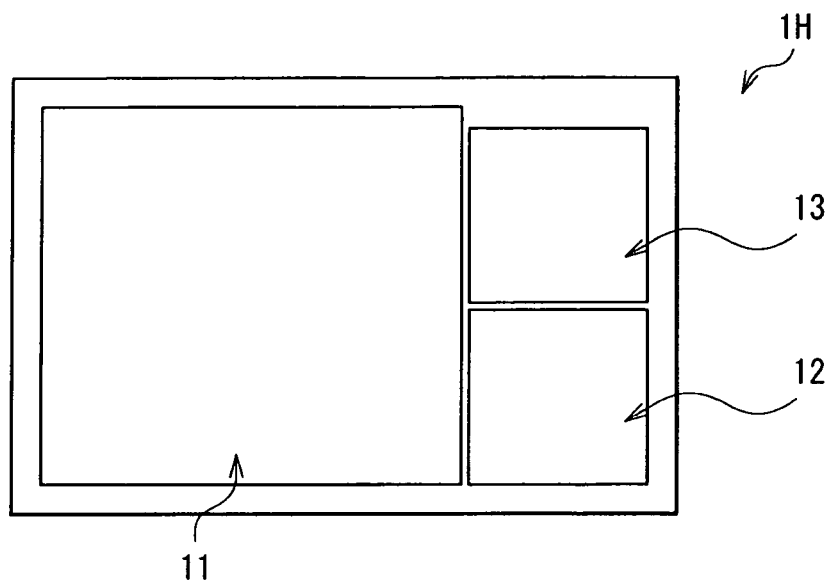
FIG. 5 is a schematic diagram of a state in which a broadcast picture and a picturephone picture are displayed simultaneously.
Figure 6:
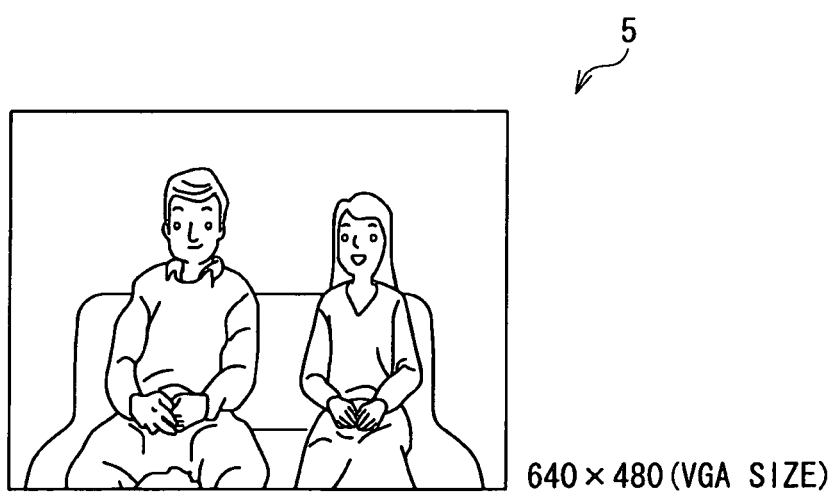
FIG. 6 is a schematic diagram for explaining an example of the method of generating a sensor picture.

An embodiment of the present invention will be described in detail with reference to the drawings. Incidentally, the description will be provided in the following order.
1. Embodiment
   Configuration of picturephone system (FIG. 1)
   Configuration of VC device (FIG. 2)
   Picturephone function (FIG. 3A-FIG. 5)
   Effect
2. Modification
   Human sensor (FIG. 6)

1. Embodiment

[Configuration of Picturephone System]

Figure 1:
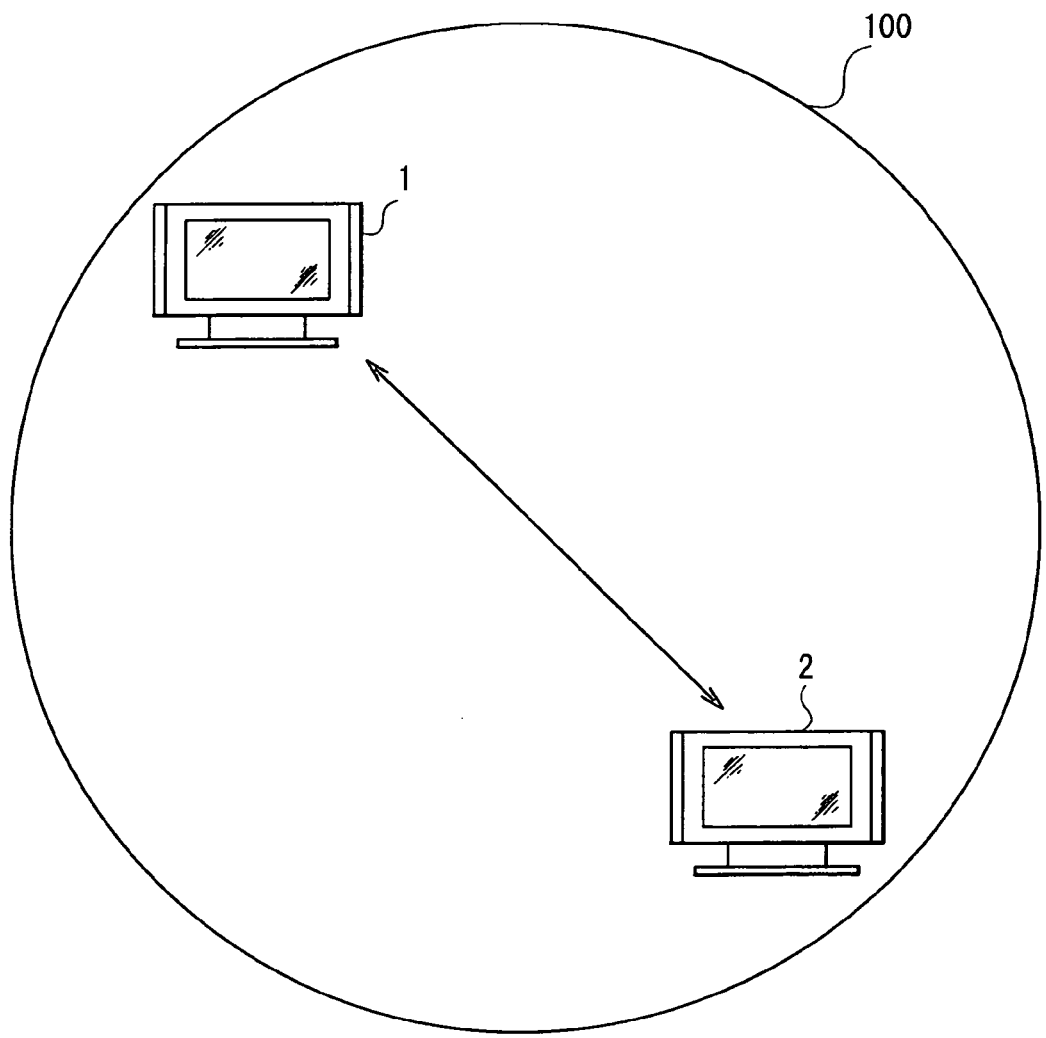
FIG. 1 is a block diagram illustrating an example of the configuration of a picturephone system including a VC (Visual Communication) device according to an embodiment of the present invention.

FIG. 1 is a block diagram illustrating an example of the configuration of a picturephone system 100 including plural VC devices according to an embodiment of the present invention. For example, the picturephone system 100 includes two VC devices 1 and 2 connected to an open network 200. The open network 200 refers to a network in which communication is performed by using a communication protocol generally used in picturephones. To the open network 200, other VC devices can be connected at any time. Incidentally, in the present embodiment, the VC device 1 or the VC device 2 corresponds to a specific example of the "communication device" according to an embodiment of the present invention.

Figure 2:
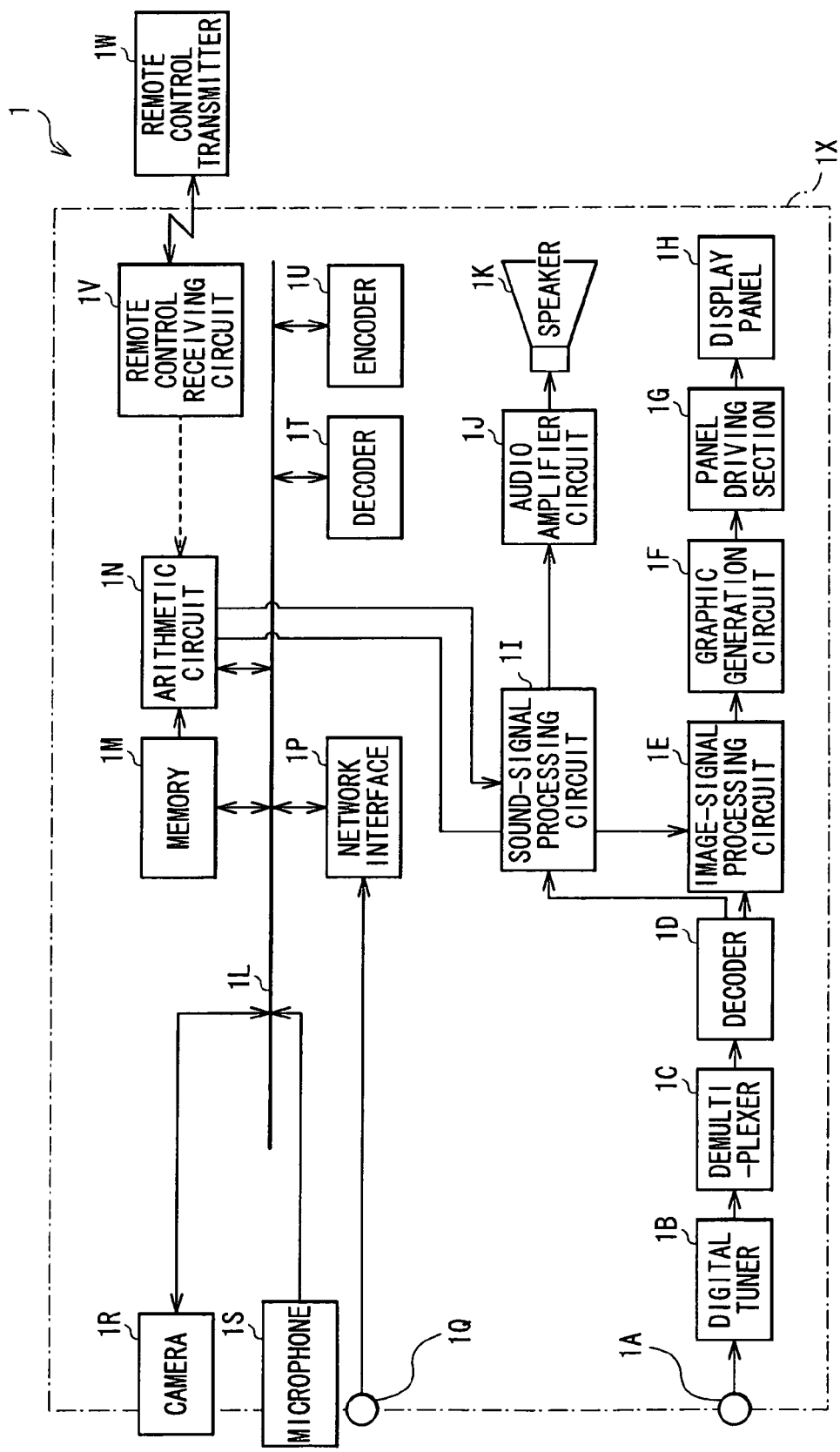
FIG. 2 is a diagram illustrating an example of the internal configuration of the VC device in FIG. 1.

FIG. 2 is a block diagram illustrating an example of the configuration of the VC device 1. Incidentally, the VC device 2 includes the same components as those of the VC device 1. The VC device 1 is, for example, a television that can be connected to the Internet. The VC device 1 includes, for example, an antenna terminal 1A, a digital tuner 1B, a demultiplexer 1C, a decoder 1D, an image-signal processing circuit 1E, a graphic generation circuit 1F, a panel driving section 1G and a display panel 1H. The VC device 1 also includes, for example, a sound-signal processing circuit 1I, an audio amplifier circuit 1J and a speaker 1K. The VC device 1 further includes, for example, an internal bus 1L, a memory 1M, an arithmetic circuit 1N, a network interface 1P, a network terminal 1Q, a camera 1R, a microphone 1S, a decoder 1T, an encoder 1U, a remote control receiving circuit 1V and a remote control transmitter 1W. Incidentally, alternate long and short dashed line illustrated in FIG. 2 represents, for example, a main unit (enclosure 1X) of the VC device 1, and indicates the remote control transmitter 1W is provided separately from the main unit of the VC device 1.

The antenna terminal 1A is a terminal to which a television broadcast signal received by a receiving antenna (not illustrated) is input. The digital tuner 1B is, for example, configured to process the television broadcast signal input into the antenna terminal 1A, thereby outputting a predetermined transport stream corresponding to a channel selected by a user. The demultiplexer 1C is, for example, configured to extract a partial TS (Transport Stream) corresponding to the channel selected by the user, from the transport stream captured by the digital tuner 1B.

The decoder 1D is, for example, configured to subject a video PES (Packetized Elementary Stream) packet included in the partial TS obtained by the demultiplexer 1C to decoding processing, thereby obtaining picture data (broadcast picture data). Further, the decoder 1D is, for example, configured to subject a sound PES packet included in the partial TS obtained by the demultiplexer 1C to decoding processing, thereby obtaining sound data.

The image-signal processing circuit 1E and the graphic generation circuit 1F are configured, for example, to subject the picture data obtained by the decoder 1D and the decoder 1T to multi-graphic processing, graphics-data superposition processing, and the like, as needed. The graphic generation circuit 1F is, for example, configured to generate a UI (User Interface) screen to be used at the time of screen display. The panel driving section 1G is, for example, configured to generate a driving signal based on the picture data output by the graphic generation circuit 1F, and to drive the display panel 1H by using the driving signal.

The display panel 1H is configured by, for example, a LCD (Liquid Crystal Display), an organic EL (Electro Luminescence) display panel, or a PDP (Plasma Display Panel). The sound-signal processing circuit 1I is, for example, configured to subject the sound data obtained by the decoder 1D and the decoder 1T to processing including D-A conversion and the like. The audio amplifier circuit 1J is, for example, configured to amplify the sound signal output by the sound-signal processing circuit 1I and supply the amplified sound signal to the speaker 1K.

The memory 1M performs, for example, storage of the setting information of the VC device 1, storage of various kinds of software, and data management. The memory 1M includes, for example, a flash ROM (Read Only Memory) (not illustrated) that stores control software for controlling the VC device 1, and data to be used at the time when this control software is executed. The memory 1M further includes, for example, a DRAM (Dynamic Random Access Memory) (not illustrated) that forms a work area of the various kinds of software. The memory 1M further includes, for example, a HDD (Hard Disk Drive) (not illustrated) that stores various kinds of applications. As such applications, an application (not illustrated) that realizes a picturephone function is stored in the HDD by default.

The arithmetic circuit 1N controls the operation of each part of the VC device 1 and is, for example, configured to develop the software read from the HDD of the memory 1M in the work area of the memory 1M and start the software, thereby controlling the operation of each part of the VC device 1.

The network terminal 1Q is, for example, a terminal connected to the network (the open network 200), and connected to the network interface 1P. The network interface 1P is, for example, an interface that communicates with others (the VC device 2 and the like) according to Ethernet (registered trademark) which is one type of standard of LAN (Local Area Network). Incidentally, the Ethernet (registered trademark) is a registered trademark of Fuji Xerox Co., Ltd. The network interface 1P is, for example, connected to the internal bus 1L, together with the arithmetic circuit 1N, the memory 1M, the camera 1R, the microphone 1S, the decoder 1T and the encoder 1U.

The camera 1R takes a picture of scenery in the front of the display panel 1H, and is disposed, for example, on the fringe of the display panel 1H. The camera 1R is, for example, configured to include an imaging element such as a CCD (Charge Coupled Device) image sensor or a CMOS (Complementary Metal Oxide Semiconductor) image sensor. The camera 1R is equipped with, for example, a wide-angle lens (not illustrated), on its plane of light incidence (not illustrated). The wide-angle lens is shaped to realize, for example, an angle of view of 60 degrees or more.

The microphone 1S mainly captures the sound in front of and around the display panel 1H and is disposed, for example, on the fringe of the display panel 1H.

The decoder 1T obtains picture data by, for example, performing the decoding processing on the video PES packet included in the data obtained from the network terminal 1Q via the network interface 1P. Further, the decoder 1T also obtains sound data by, for example, performing the decoding processing on the sound PES packet included in the data provided from the network terminal 1Q via the network interface 1P.

The encoder 1U is, for example, configured to subject the picture data (picturephone picture data) obtained from the arithmetic circuit 1N to encoding processing, thereby obtaining data to be transmitted. The encoder 1U is also configured, for example, to subject the sound data obtained from the microphone 1S to the encoding processing, thereby obtaining data to be transmitted.

The remote control receiving circuit 1V is, for example, configured to receive a remote control signal transmitted from the remote control transmitter 1W and supply the received signal to the arithmetic circuit 1N. The arithmetic circuit 1N is, for example, configured to control each part of the VC device 1 according to the remote control signal.

[Picturephone Function]

Next, a picturephone function in the VC device 1 will be described. In the VC device 1 of the present embodiment, for example, in accordance with a user instruction, the arithmetic circuit 1N develops the application that implements the picturephone function into the DRAM and starts the application. Subsequently, in accordance with various instructions from the user, the arithmetic circuit 1N executes the application.

(Transmission)

Subsequently, the arithmetic circuit 1N instructs the camera 1R to take a moving picture and also instructs the microphone 1S to pick up the sound. Then, the camera 1R starts taking the moving picture and transfers obtained picture data to the arithmetic circuit 1N, and the microphone 1S starts picking up the sound and transfers obtained sound data to the arithmetic circuit 1N. The arithmetic circuit 1N inputs the obtained sound data into the encoder 1U, and performs predetermined processing (clipping processing that will be described later) on the obtained picture data and then inputs the processed picture data (a partial picture 4 that will be described later) into the encoder 1U. Then, the encoder 1U performs the encoding processing on the input sound data and picture data, and inputs the encoded data into the arithmetic circuit 1N. The arithmetic circuit 1N transmits the data to the VC device 2 of a communication counterpart through the network interface 1P and the network terminal 1Q.

(Reception)

Upon acquisition of data from the VC device 2 of the communication counterpart through the network interface 1P and the network terminal 1Q, the arithmetic circuit 1N inputs the data into the decoder 1T. Then, the decoder 1T performs the decoding processing on the input data, generates picture data and sound data from the data, and inputs the generated picture data and sound data into the arithmetic circuit 1N.

The arithmetic circuit 1N inputs the obtained picture data into the image-signal processing circuit 1E via, for example, a High-Definition Multimedia Interface (HDMI). Then, the image-signal processing circuit 1E performs predetermined processing on the obtained picture data and then, inputs the resultant picture data into the graphic generation circuit 1F. The graphic generation circuit 1F performs predetermined processing on the obtained picture data and then, inputs the processed picture data into the panel driving section 1G as a picture signal. The panel driving section 1G drives the display panel 1H based on the picture signal, thereby causing the display panel 1H to display a picture. As a result, the picture of the counterpart is displayed on the display panel 1H.

Further, the arithmetic circuit 1N inputs the obtained sound data into the sound-signal processing circuit 1I via, for example, the HDMI. Then, the sound-signal processing circuit 1I performs predetermined processing on the obtained sound data and then, inputs the processed sound data into the speaker 1K via the audio amplifier circuit 1J. As a result, the sound of the counterpart is output from the speaker 1K. In this way, the interactive communication of sound and picture by using the picturephone function is carried out.

(Clipping Processing)

Next, there will be described the clipping processing in the VC devices 1 and 2.

In the present embodiment, the arithmetic circuit 1N performs the clipping processing that will be described below on the picture data obtained from the camera 1R.

Figure 3A:
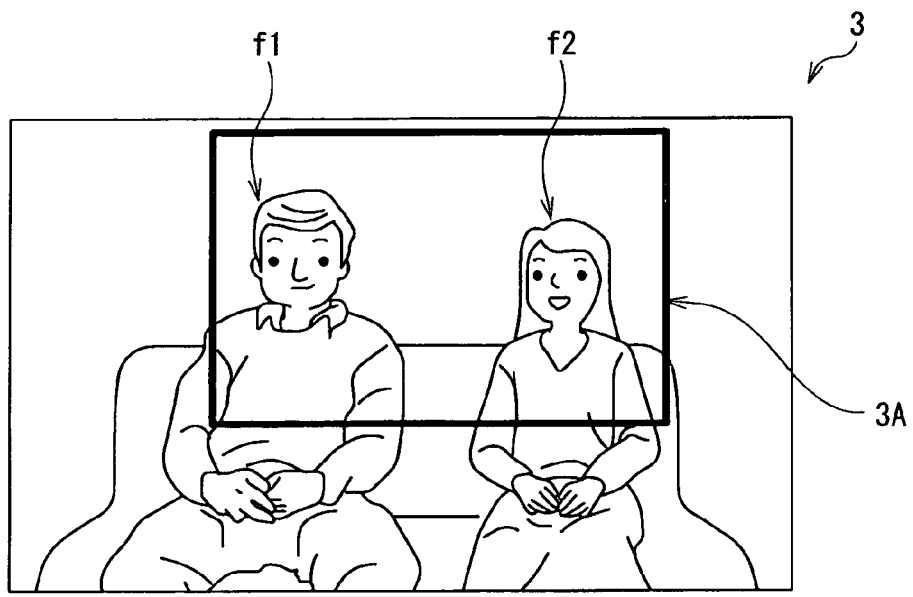
FIG. 3A and 3B are schematic diagrams for explaining an example of the method of generating a partial picture.
Figure 3B:
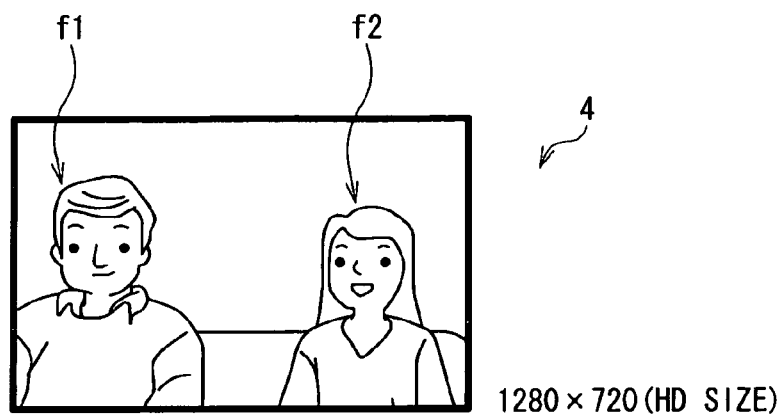

When the picture data obtained from the camera 1R is, for example, a picture as illustrated in FIG. 3A (obtained picture 3), the arithmetic circuit 1N, at first, detects face images f1 and f2 in the obtained picture 3. Subsequently, the arithmetic circuit 1N sets a clipped region 3A including the all detected face images f1 and f2 in the obtained picture 3, clips the clipped region 3A out of the obtained picture 3, and generates the partial picture 4 as illustrated in FIG. 3B. At the time, the arithmetic circuit 1N adjusts (reduces or expands) the size of the partial picture 4 as needed.

When, for example, the pixel size of the camera 1R is large (e.g., 5M pixels), and the size of the partial picture 4 exceeds a HD size, the arithmetic circuit 1N reduces the size of the partial picture 4 to the HD size. Further, when, for example, the size of the partial picture 4 is less than the HD size, the arithmetic circuit 1N enlarges the size of the partial picture 4 to the HD size. In this way, the clipping processing in the arithmetic circuit 1N is carried out.

Figure 4A:
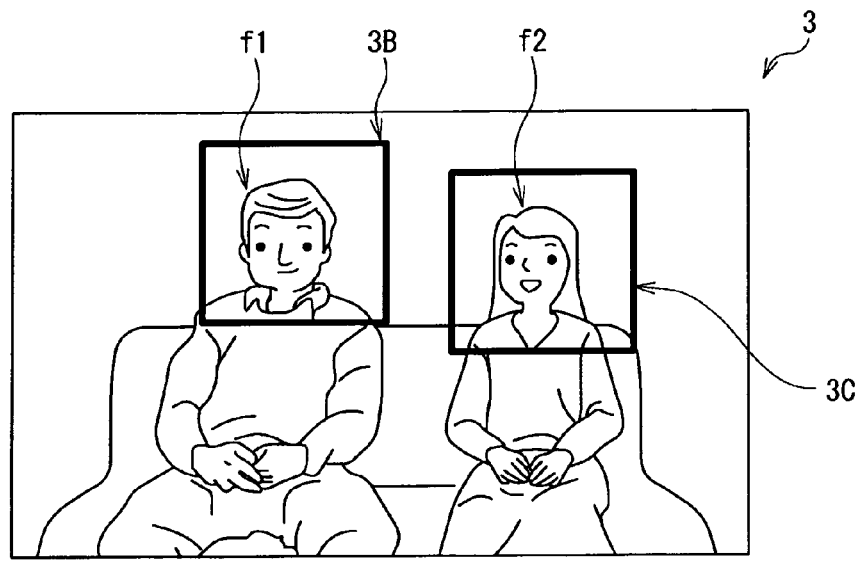
FIG. 4A and 4B are schematic diagrams for explaining another example of the method of generating the partial picture.
Figure 4B:
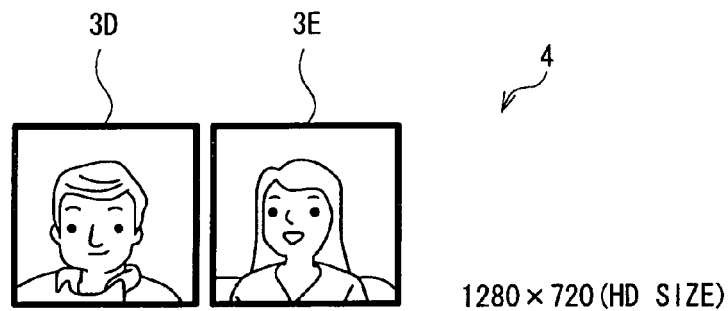

Incidentally, the clipping processing may be performed by using another method. For example, when the picture data obtained from the camera 1R is a picture as illustrated in FIG. 4A (obtained picture 3), the arithmetic circuit 1N, at first, detects the face images f1 and f2 in the obtained picture 3. Subsequently, the arithmetic circuit 1N sets clipped regions 3B and 3C including the face image f1 and the face image f2 in the obtained picture 3, respectively, for the individual face images f1 and f2, clips the clipped regions 3B and 3C out of the obtained picture 3, and generates two portrait pictures 3D and 3E (see FIG. 4B). Subsequently, the arithmetic circuit 1N merges the generated two portrait pictures 3D and 3E, thereby producing a partial picture 4 illustrated in FIG. 4B. The merge of the two portrait pictures 3D and 3E is performed, as illustrated in FIG. 4B for example, by arranging the two portrait pictures 3D and 3E side by side in parallel. At the time, the arithmetic circuit 1N adjusts (reduces or expands) the size of the partial picture 4 as needed, in a manner similar to the way described above. In this way, the clipping processing in the arithmetic circuit 1N may be carried out.

Incidentally, the arithmetic circuit 1N may choose either one of the two methods described above, in accordance with an instruction of the user.

(Concurrent Use of Broadcast and Picturephone)

Next, there will be described the "concurrent use of broadcast and picturephone" in the VC devices 1 and 2. In the present embodiment, each of the VC devices 1 and 2 is a television with the picturephone function. Therefore, the VC devices 1 and 2 can cause the display panel 1H to display broadcast picture data while serving as a picturephone, according to an instruction of the user. For example, as illustrated in FIG. 5, the arithmetic circuit 1N causes the display panel 1H to display a broadcast picture 11 and picturephone pictures 12 and 13 at the same time.

The picturephone picture 12 is a picture generated based on the data obtained from the VC device 2 of the counterpart, and the picturephone picture 13 is a picture generated based on the data obtained from the camera 1R of the user's own VC device 1. Incidentally, the arithmetic circuit 1N may cause the display panel 1H to display either one or both of the picturephone pictures 12 and 13, depending on an instruction of the user.

Such simultaneous display is enabled by provision of the decoder 1D for broadcasting and the decoder 1T for picturephone in each of the VC devices 1 and 2. Incidentally, the decoder 1D and the decoder 1T may be provided in different chips, or may be provided in the same chip. However, when the decoder 1D and the decoder 1T are provided in the same chip, the decoder 1D is, for example, a dual decoder including the decoder 1T, and the data inputted from the VC device 2 is input into the decoder 1D via the network interface 1P, the memory 1M and the like.

[Effect]

In the present embodiment, in the VC device 1, the face images f1 and f2 are detected from the obtained picture 3 that is captured by the camera 1R, and the partial picture 4 including the detected face images f1 and f2 is generated. As a result, the partial picture 4 is displayed as a picturephone picture on the display panel 1H in the VC device 2 of the counterpart. In other words, in the present embodiment, rather than adjustment of the angle of view itself of the camera 1R, adjustment of the picture size correlated with the angle of view of the camera 1R is performed by the generation of the partial picture 4 (the clipping of the partial picture out of the original picture). As a result, for example, two or more people can communicate with a counterpart by using one VC device 1 at the same time, and even when the user moves in front of the camera 1R, each person can be displayed in a large size on the display panel 1H of the VC device 2 of the counterpart. Therefore, it is possible to improve a decline in the usability due to the angle of view of the camera.

2. Modification

In the embodiment described above, the case in which the display panel 1H and the panel driving section 1G are built in the main unit (enclosure 1X) of the VC device 1 has been taken as an example, but the display panel 1H and the panel driving section 1G may be provided separately from the main unit (enclosure 1X) of the VC device 1. In this case, the display panel 1H and the panel driving section 1G are external devices for the VC device 1 and thus, for example, the VC device 1 controls the external devices (the display panel 1H and the panel driving section 1G) by cable or radio.

Further, in the embodiment described above, the case in which the VC device 1 is a television has been taken as an example, but the VC device 1 may not be a television. In this case however, for example, the VC device 1 causes the display panel 1H to display a broadcast picture by using picture data and sound data inputted from a piece of electronic equipment (a tuner) configured to include the digital tuner 1B, the demultiplexer 1C, the decoder 1D and the like, and causes the speaker 1K to output the sound.

Furthermore, in the embodiment described above, the case in which in the VC device 1, the part functioning as a picturephone is built in the enclosure 1X has been taken as an example, but this part may be provided separately from the main unit (enclosure 1X) of the VC device 1. In this case, for example, the part functioning as the picturephone is an external device for the VC device 1 and thus, for example, the VC device 1 controls the external device (the part functioning as the picturephone) via USB (Universal Serial Bus).

Moreover, in the embodiment and the modification described above, the camera 1R may function as a human sensor. At the time, there is no need to clip the partial picture 4 out of the obtained picture 3 captured by the camera 1R and, the size of the picture may only need to be a size sufficient for use of the obtained picture 3 captured by the camera 1R for the purpose of the human sensor. When the size sufficient for use for the purpose of the human sensor is, for example, a VGA size, the arithmetic circuit 1N, for example, adjusts the size of the obtained picture 3 captured by the camera 1R to the VGA size, and performs one or more of various kinds of processing to be described below, by using the post-adjustment picture data.

(Energy Saving Function)

For example, the arithmetic circuit 1N may be configured to stop the picture display in the display panel 1H when the arithmetic circuit 1N cannot detect a face image from the picture captured by the camera 1R, and subsequently to cancel the stoppage of the picture display in the display panel 1H when the arithmetic circuit 1N detects a face image from the picture captured by the camera 1R.

(Approach Preventing Function)

Further, for example, the arithmetic circuit 1N may be configured to derive, when detecting a face image from the picture captured by the camera 1R, a distance from the camera 1R to the detected face image or a numerical value corresponding to the distance, thereby performing predetermined processing when the distance or the numerical value exceeds a predetermined threshold. The predetermined processing here includes, for example, generation of an audible alert, reduction in the brightness of the picture displayed on the display panel 1H, and the like.

(Sound Balance Correction Function)

Furthermore, for example, the arithmetic circuit 1N may be configured to derive, when detecting a face image from the picture captured by the camera 1R, an orientation of the detected face image or a numerical value corresponding to the orientation, thereby performing predetermined processing according to the orientation or the numerical value. The predetermined processing here includes, for example, adjustment of the sound balance between right and left.

Incidentally, the angle of view of the camera 1R is, for example, 60 degrees or more as mentioned above, which is the size sufficient for use as a human sensor. In the present modification, when the camera 1R is used as a camera for the picturephone, the VC device 1 performs the "clipping processing" described above on the picture taken by the camera 1R, thereby narrowing the angle of view of the camera 1R mimetically. Further, when the camera 1R is used as a camera for the human sensor, the VC device 1 takes a picture of a wide area in front of the display panel 1H by using the wide angle of view of the camera 1R, and performs the various kinds of processing described above by using the taken picture. In this way, in the present modification, a camera for a picturephone that requires a narrow angle of view and a camera for a human sensor that requires a wide angle of view are realized by the single camera 1R. This makes it possible to eliminate an increase in the cost of components due to addition of a human sensor function.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a camera capturing a picture;
an information processing section detecting a face image or images from the picture captured by the camera, to generate a partial picture including the detected face image or images;
a transmitting section encoding the partial picture to generate encoded data, and transmitting the encoded data to a counterpart; and
a first receiving section receiving data transmitted from the counterpart, and decoding the received data to generate a picturephone picture,
wherein when a plurality of face images are detected from the picture captured by the camera, the information processing section performing clip processing in accordance with either one of at any time:
a first method which includes setting a single clip region which includes all the detected face images, in which the clip region is smaller than the entire region of the picture captured by the camera, and generating a plurality of portrait pictures from the clip regions, and merging the generated plurality of portrait pictures to generate the partial picture,
wherein the information processing section selects the first method or the second method according to a user instruction such that when the user instruction indicates the first method the information processing section performs the clip processing in accordance with the first method and when the user instruction indicates the second method the information processing section performs the clip processing in accordance with the second method.

2. The communication device according to claim 1, wherein the camera has an angle of view of 60 degrees or more.

3. The communication device according to claim 1, further comprising:
a second receiving section receiving a television broadcast signal, and decoding the television broadcast signal to generate a broadcast picture,
wherein the information processing section allows, according to a user instruction, a display section to display either one or both of the picturephone picture and the broadcast picture.

4. The communication device according to claim 3, wherein
in a case where the user instruction is such that requests concurrent displaying of both of the picturephone picture and the broadcast picture, the information processing section allows the display section to display the picturephone picture and the broadcast picture in respective regions independent from each other.

5. The communication device according to claim 1, further comprising a driving section generating, based on a broadcast picture inputted from a tuner, a driving signal for driving a display section.

6. The communication device according to claim 1, wherein
the information processing section determines an orientation of the face image detected from the picture captured by the camera or determines a numerical value corresponding to the orientation, to perform a predetermined processing according to the orientation or the numerical value.

7. The communication device according to claim 1, further comprising a display section displaying pictures.

8. The communication device according to claim 3, further comprising:
a display section displaying pictures;
an enclosure collectively housing the camera, the information processing section, the first receiving section, the second receiving section and the display section.

9. The communication device according to claim 8, wherein the camera is disposed on a fringe of the display section.

10. The communication device according to claim 8, wherein the first receiving section is formed separately from the second receiving section.

11. The communication device according to claim 1, in which when the information processing section performs the clip processing in accordance with the second method, the plurality of portrait pictures generated from the clip regions are merged by arranging the plurality of portrait pictures in a side by side parallel manner so as to generate the partial picture.

12. The communication device according to claim 11, in which the information processing section reduces or expands the partial picture depending on whether a size thereof exceeds a HD size.

13. A picturephone device comprising:
a camera to capture a picture;
an information processing section to detect a face image or images from the picture captured by the camera, and to generate a partial picture including the detected face image or images;
a transmitting section to encode the partial picture to generate encoded data, transmit the encoded data to a counterpart; and
a first receiving section to receive data transmitted from the counterpart, and decode the received data to generate a picturephone picture,
wherein when a plurality of face images are detected from the picture captured by the camera, the information processing section performs clip processing in accordance with a method selected at any time by a user from among a first predetermined method and a second predetermined method, in which:
the first predetermined method includes setting a single clip region which includes all the detected face images, in which the clip region is smaller than an entire region of the picture captured by the camera such that the clip region does not include an entire image of the pictured captured by the camera, and generating a single partial picture from the single clip region which includes all the detected face images arranged as in the picture captured by the camera such that the detected face images are not rearranged; and
the second predetermined method includes setting a plurality of clip regions each including one detected face image, in which each of the clip regions is smaller than the entire region of the picture captured by the camera, and generating a plurality of portrait pictures from the clip regions, and merging the generated plurality of portrait pictures to generate the partial picture, and
wherein during operation the information processing section performs a selected one of (1) or (2) such that when the user instruction indicates the first method the information processing section performs the clip processing in accordance with the first method and when the user instruction indicates the second method the information processing section performs the clip processing in accordance with the second method.

* * * * *